Figure 1:
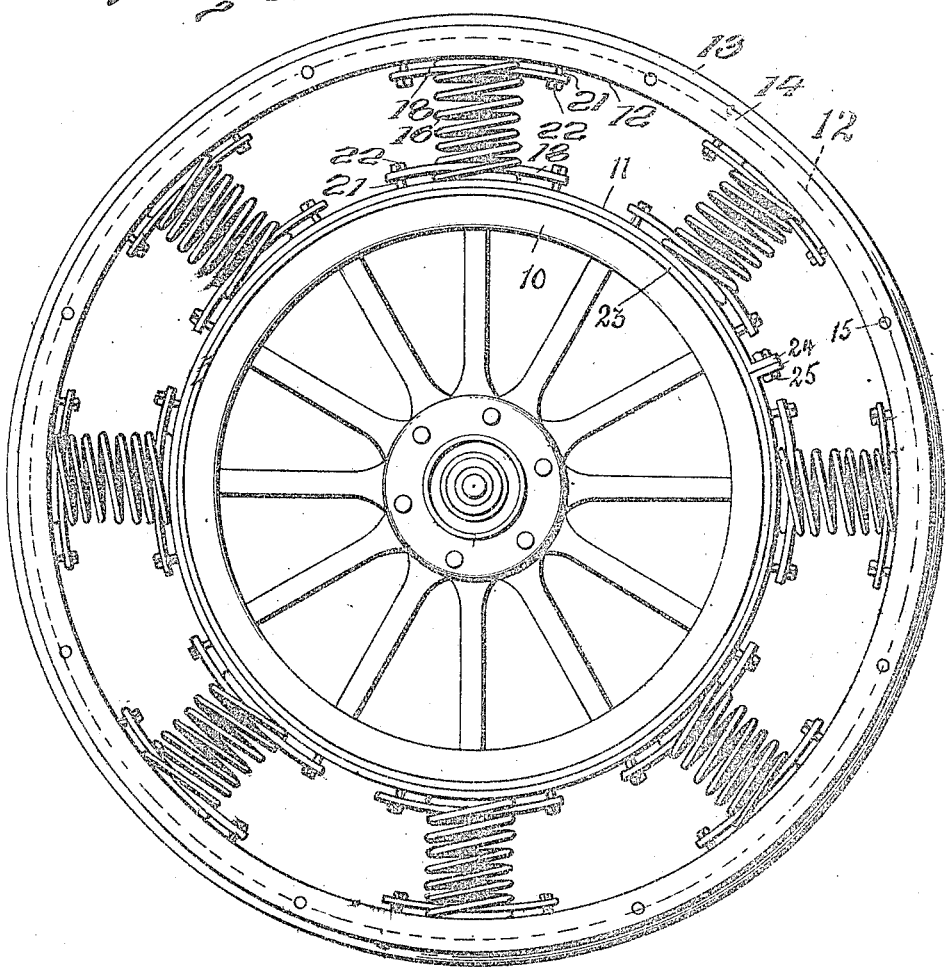

A. N. BARTLETT.
SPRING WHEEL.
APPLICATION FILED JULY 24, 1915.

1,165,647.

Patented Dec. 28, 1915.
2 SHEETS—SHEET 1.

Inventor
Albion N. Bartlett

By ............., Attorneys

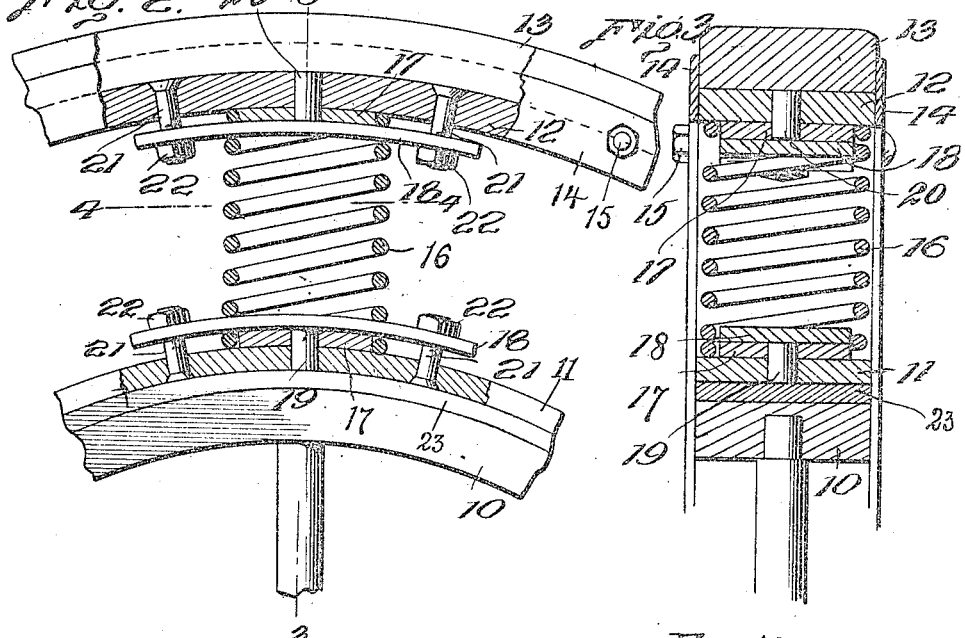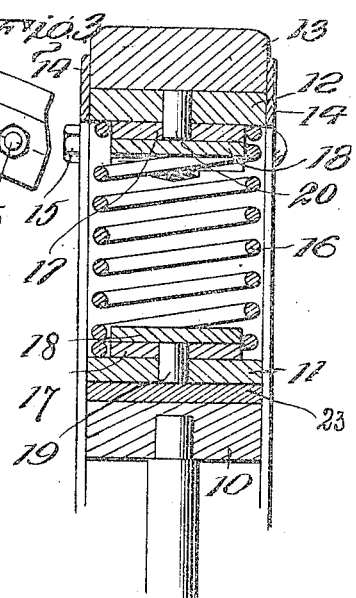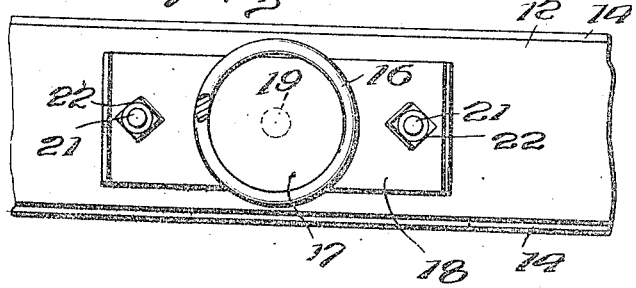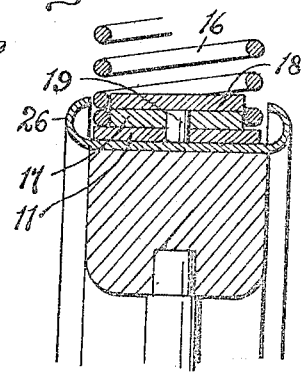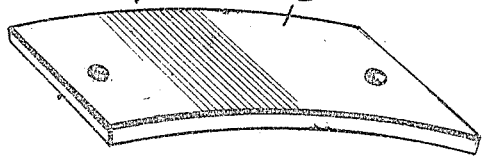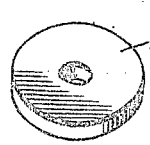

UNITED STATES PATENT OFFICE.

ALBION N. BARTLETT, OF HARBOR SPRINGS, MICHIGAN.

SPRING-WHEEL.

1,165,647.  Specification of Letters Patent.  Patented Dec. 28, 1915.

Application filed July 24, 1915. Serial No. 41,758.

*To all whom it may concern:*

Be it known that I, ALBION N. BARTLETT, a citizen of the United States, residing at Harbor Springs, in the county of Emmet and State of Michigan, have invented certain new and useful Improvements in Spring-Wheels, of which the following is a specification.

This invention relates to improvements in wheels, and more particularly to the class of spring wheels wherein a plurality of springs are employed to provide a resilient structure between the body of the wheel and the road-bed, and has for one of its objects to simplify and improve the construction and increase the efficiency and utility of devices of this character.

Another object of the invention is to provide a simply constructed and efficient device of this character which may be readily and quickly applied to the tires of ordinary vehicle wheels or the clencher rims of automobile wheels, without material structural change.

With these and other objects in view, the invention consists in certain novel features of construction as hereinafter shown and described and then specifically pointed out in the claims; and in the drawings illustrative of the preferred embodiment of the invention Figure 1 is a side elevation of a conventional vehicle wheel with the improvement applied; Fig. 2 is an enlarged sectional detail illustrating the construction and the manner of supporting the springs relative to the tire and felly of the wheel; Fig. 3 is a sectional view on the line 3—3 of Fig. 2; Fig. 4 is a view in section on the line 4—4 of Fig. 2, looking toward the outer rim and tire of the wheel; Fig. 5 is a detail perspective view of one of the spring supporting clamp plates; Fig. 6 is a detail perspective view of one of the spring holding plates. Fig. 7 is a sectional detail illustrating the manner of applying the attachment to the clencher rim of an ordinary automobile wheel.

Corresponding and like parts are referred to in the following description and indicated in all the views of the drawings by the same reference character.

The improved device may be applied to wheels of various forms and sizes, but for the purpose of illustration is shown in Figs. 1, 2, 3 and 4 applied to a conventional vehicle wheel including a felly 10 and tire 23, and in Fig. 7 to the clencher rim 26 of a conventional automobile wheel, these parts being of the usual construction.

Surrounding the ordinary tire 23 of the wheel or the clencher rim 26, as the case may be, is an inner divided rim member 11 outturned at its terminals as shown at 24 and the outturned portions coupled by a clamp bolt 25.

Surrounding the body of the wheel and the inner rim 11, is an outer rim 12 spaced from the rim 11 and preferably arranged to support a tire 13 of rubber or like material. The tire 13 is held in position relative to the rim 12 by annular clamp plates 14 secured in place and overlapping a portion of the tire 13 by transverse bolts 15. The bolts 15 are spaced at uniform distances apart and embedded partly in the outer face of the rim 12 and in the adjacent inner portion of the tire 15, as indicated in Fig. 1, so that the bolts operate to prevent the tire 13 from "creeping" around the rim.

Bearing between the inner rim 11 and the outer rim 12, at suitable intervals, are a plurality of springs 16, preferably in coiled form with the terminal helixes of the springs bearing flatly against the outer face of the inner rim 11 and the inner face of the outer rim 12. Inserted within the terminal helixes of each spring are suitable holding plates, one of which is represented more specifically at 17 in Fig. 6. The members 17 thus retain the coils of the spring in position and prevent lateral displacement relative to the coacting rims, as will be obvious.

Inserted between the coils of the spring, next to the terminal helixes, are clamp plates 18, the members 18 being curved to correspond to the curvature, respectively, of the inner rim 11 and the outer rim 12, as illustrated in Fig. 2. By this arrangement, the members 18, it will be noted by reference to Fig. 2, bear not only against the holding members 17, but likewise against the terminal helixes of the springs, each of the members 17 being apertured to receive pins 19—20 projecting, respectively, from the inner rim 11 and the outer rim 12, as shown in Figs. 2 and 3.

The members 18 extend for a considerable distance at each side of the springs 16 and are retained in position by clamp bolts 21 operating, respectively, through the rims 11 and 12 and provided with clamp nuts 22. By this means, it will be obvious that by actuating the nuts 22, the members 18 will be firmly clamped in position and bind the springs and the holding members 17 firmly against the coacting rims, and lock the parts from displacement in any direction.

When assembling the parts of the wheel, the springs are so constructed that when connected to the coacting rims, they will require to be strained outwardly, or subjected to a considerable tension to enable them to be connected to the outer rim. Thus the wheel portion and inner rim are maintained normally concentrically of the rim 12 and tire 13, when no load is applied. When the load is applied, the strain is principally downward from the upper side, and the "pull" also exerted from the upper side.

By this construction, it will be obvious that an effectual tire device is produced, which is strong and durable and which may be applied without material structural change to wheels of various forms and sizes and wheels of various structures. The rim 12 is thus yieldably held in position, leaving the wheel free to yield vertically under the load placed upon the vehicle, but without displacing the parts.

Any required number of the springs may be employed, depending upon the size of the wheels, and it is not desired to limit the device in any manner in this respect.

The improved device may be readily employed as a substitute for a pneumatic tire by applying it to the clencher rim 26 as shown in Fig. 7.

Having thus described the invention, what is claimed as new is:—

A device of the class described comprising an inner rim adapted to be attached to a wheel, an outer rim spaced from the inner rim and adapted to support a tire, each of said rims having a plurality of apertures, a pin in each of the apertures of the inner rim and extending in advance of the same and bearing against the adjacent wheel member, a pin in each of the apertures of the outer rim and extending in advance of the same and bearing against the tire, a perforated holding plate engaging over each of said pins, a coiled spring engaging by its terminal helixes around each opposite pair of said holding plates and held from lateral displacement thereby, a clamp plate bearing against each of the holding plates and extending through the coils of the springs, and fastening means connecting said clamp plates respectively to the outer and inner rims.

In testimony whereof I affix my signature in presence of two witnesses.

ALBION N. BARTLETT. [L. S.]